United States Patent [19]

Millar

[11] 4,097,639

[45] Jun. 27, 1978

[54] FLAMBOYANT FINISH AND PROCESS FOR APPLYING SAME

[75] Inventor: John M. Millar, Joppa, Md.

[73] Assignee: Beatrice Foods Co., Chicago, Ill.

[21] Appl. No.: 744,763

[22] Filed: Nov. 24, 1976

[51] Int. Cl.[2] .......................... B05D 1/38; B05D 5/06; B05D 7/14; B32B 15/08

[52] U.S. Cl. ................................ 428/215; 280/281 R; 427/27; 427/160; 427/375; 427/379; 427/380; 428/216; 428/220; 428/328; 428/334; 428/335; 428/339

[58] Field of Search ............... 427/160, 375, 379, 380, 427/27; 428/215, 98, 216, 220, 334, 335, 339, 328; 280/281 R

[56] References Cited

U.S. PATENT DOCUMENTS

| | | | |
|---|---|---|---|
| 3,117,886 | 1/1964 | Glynn | 428/204 |
| 3,389,013 | 6/1968 | Armitage et al. | 428/204 |
| 3,953,643 | 4/1976 | Cheung et al. | 427/379 X |
| 3,953,644 | 4/1976 | Camelon et al. | 427/379 X |

*Primary Examiner*—James R. Hoffman

*Attorney, Agent, or Firm*—Murray & Whisenhunt

[57] ABSTRACT

A process for applying a coating exhibiting high gloss, and good depth appearance is disclosed, as well as the resulting coated product. For instance, a first coating is applied to a conductive substrate, wherein the first coating consists of a polyester polymer, a blocked catalyst therefor, and bright reflective leafing metallic flake pigments. The coated substrate is heated to a first temperature high enough to permit the flake pigments to move to a position wherein the flakes are substantially oriented parallel to the coating surface, but not high enough to unblock the catalyst. After the pigment flakes have obtained the desired oriented position, the coating is heated to a second temperature high enough that the catalyst unblocks and cures or gels the polymer.

Thereafter, a transparent second coating is applied over the cured first coating, with the second coating being a clear polymer containing a tinting amount of soluble coloring agent therein.

The process is highly suitable for coating bicycle frames, motorcycle frames, and the like, wherein a high gloss, decorative coating exhibiting good weather resistance is required. Such coatings are generally called flamboyant finishes.

33 Claims, No Drawings

FLAMBOYANT FINISH AND PROCESS FOR APPLYING SAME

BACKGROUND OF THE INVENTION

The present invention relates to the production of a flamboyant finish on conductive substrates. As used in this specification, the term "flamboyant finish" refers to a coating having a high gloss, metallic, good depth appearance, wherein a transparent color coating overlies a bright metallic background.

The prior art of applying a decorative protective coating on such items as bicycle and motorcycle frames has been primarily in the use of liquid-based coating systems. There have been a few instances wherein manufacturers of bicycles or motorcycles have used a powder coating system to apply a single coat of a solid color to a conductive substrate, but no flamboyant finishes have been produced from this prior art use of powder coating technology.

U.S. Pat. No. 3,598,659 discloses a method for applying a corrosion-resistant coating upon metals, wherein a first layer is applied, which contains active components for pacifying the metal surface, such as a mixture of phosphoric acid, a metal oxide and a powdery metal, a film-forming component, such as an alkyd resin, a hydrophilic bonding agent such as talcum, and a mixture of organic solvents. After solidification of the first layer, it is coated with a second layer which is an epoxide resin, which may contain dyes, pigments and/or glazing agents. The resulting coating is indicated to have exceptional adherability and resistance to corrosion.

U.S. Pat. No. 2,878,141 discloses a method of forming a bright, highly reflective finish upon sheet steel, by applying a first coating of a film-forming resin dissolved in a suitable solvent, and then, while the first coating is still wet, applying over it a second coating of a film-forming resin, a suitable solvent therefor, and finely divided aluminum dispersed throughout the second coating. Upon evaporation of the solvent from both coatings, the resins solidify and harden, with a certain amount of intermingling to cause good adhesion between the top coat and the base coat. The aluminum particles stratify and concentrate near the surface of the combined coatings, producing a smooth, lustrous, light-reflective finish. The aluminum pigment which is used is of the type known as leafing aluminum, in the form of very small thin flat plates.

The use of multiple coatings of film-forming materials over a suitable substrate, such as a metal substrate, has been widely used for various purposes in different arts, including the corrosion protection art, the decorative finish art, and the like. See, e.g., U.S. Pat. Nos. 2,782,131; 3,125,484; 3,443,983; 2,636,257; 3,549,407; 2,891,876; and 2,390,758, as well as Defensive Publication 753,705.

DESCRIPTION OF THE INVENTION

The present invention relates to a method of producing a flamboyant finish or coating on a substrate, and to the coating produced thereby, which coating has good depth appearance and high gloss. The coating may exhibit an appearance similar to that of anodized aluminum, or other visual characteristics can be obtained as desired.

Basically, the flamboyant finish is produced by applying a first coating of a thickness of generally at least about 1 mil of a first coating composition to a substrate. Preferably, the first coating composition is applied by electrostatically spraying the composition on a conductive substrate. This first coating composition is based upon a thermosetting film-forming first polymer, a catalytic amount of a blocked catalyst for the first polymer, and flake pigments. Other conventional additives, such as UV-resistance agents and the like, may be added if desired.

The thermosetting polymer is a curable, substantially clear, film-forming polymer, having a molecular weight in the film-forming range, preferably a polyester polymer. Suitable commercial polyester polymers include esters of terephthalic acid and glycols of 2 – 10 carbon atoms. Other polymers which can be used include epoxy and urethane polymers, as well as thermosetting acrylic polymers.

The polymer catalyst is a so-called "blocked" catalyst, wherein the catalyst exhibits little or no catalytic activity at temperatures below the polymer melting point, and at temperatures slightly above the polymer melting point, i.e., 5° above the polymer melting point. However, when heated to temperatures at least 5° F above the polymer melting temperature the catalyst unblocks to exhibit substantial catalytic activity, and cures the polymer. While various types of blocked catalysts can be utilized, it is preferred that the catalyst be a blocked isocyanate catalyst, such as a blocked aliphatic isocyanate commercially available from the Cargill Company, under the trade name Cargill CR 10.

The flake pigment which is used in the first coating composition is a bright, reflective leafing pigment, generally a metallic pigment such as, for example, an aluminum, chromium, bronze, stainless steel or silver flake pigment. Preferably, the pigment is a leafing aluminum pigment. Preferably, the flake pigment has a thickness which is less than 1/5, preferably less than 1/10, its width and depth. Normally, the pigment flake will have a mean maximum dimension less than 10 microns and greater than about 3 microns. Preferably the mean particle size of the pigment flake is less than 7 microns, more preferably between 4 and 6 microns. When the pigment flake has a maximum dimension which is less than about 3 microns, it generally is too small to yield a brilliant spectral finish. On the other hand, if the pigment flake is larger than about 10 microns in maximum dimension, it may not leaf readily in the molten polymer, so that the resulting layer of pigment flakes may have flakes oriented in different planes, and thus not be as reflective as desired. In the case of aluminum flake pigments, generally about 2 to 6 weight percent, based on the total weight of the first coating composition, will be used, and preferably about 2 to 3.5 weight percent. More preferably, the amount of the leafing aluminum flake pigments will be about 2.5 – 3.0 percent, based on the total weight of the first coating composition. If less than 2 weight percent of aluminum leafing pigments is used, then the layer of aluminum pigments will tend to be discontinuous, and the desired appearance will not be achieved. On the other hand, for electrostatic applications, amounts of aluminum pigment in excess of 3.5 weight percent will tend to cause application problems by shorting out the electrostatic apparatus. For other types of coating applications, however, the total amount of aluminum pigment may be increased, up to 6% by weight, or even higher. For other types of pigments, with differing specific gravities, the amount of pigment used, on a weight percent basis, will vary in direct proportion to the change in specific gravity, based on the above ranges for aluminum pigment flakes. The flake pigment may be generally irregular, circular, square, rectangular, or any other desired shape, but the width of the pigment will generally be at least about 30% of the length of the pigment, that is, the pigment is preferably not needle-shaped.

The coating compositions of this invention can contain other conventional additives, such as flow agents, UV agents, and the like, if desired.

The uncured first coating composition on the substrate is heated to a temperature below the catalyst unblocking temperature, but high enough such that the viscosity of the thermosetting polymer is reduced to the point that the flake pigment can move in the polymer, so that the pigment flakes tend to rise by a leafing action through the polymer and become substantially oriented parallel to the surface of the polymer removed from the substrate, but generally below the polymer surface. Generally, this temperature will be in the range of about 225°-325° F., but it will be readily appreciated that the temperature will vary depending upon the viscosity characteristics of the polyester polymer, the leafing characteristics of the pigment, and the unblocking temperature of the blocked catalyst.

The viscosity characteristics of the polyester polymer, the leafing characteristics of the particular pigment or pigments used, and the unblocking temperature of the catalyst may all vary widely, but are interrelated in that at a temperature below the catalyst unblocking temperature the leafing characteristics of the pigment in the polyester polymer at such temperature must be such that a substantial leafing effect is obtained, wherein substantially all of the pigment flakes are placed in generally the same orientation, so that a brilliant spectral appearance is obtained. Thus, for pigments with particularly good leafing abilities, the viscosity of the polymer may be somewhat higher during the time of pigment mobility than for a system wherein the pigment leafing characteristics are not as favorable. On the other hand, for systems wherein substantial leafing of the pigment cannot to obtained at the particular unblocking temperature, in some instances it may be possible to replace the blocked catalyst with another blocked catalyst which has a higher unblocking temperature, in order to obtain a lower polymer viscosity at temperatures approaching the catalyst unblocking temperature.

Thereafter, the polymer is gelled or cured by heating the first coating composition to a higher temperature of at least the catalyst unblocking temperature, so that the catalyst unblocks and cures the polymer, while maintaining the flake pigments in the above-described oriented position. It is only necessary to gel the polymer to the stage that the flake pigment is no longer mobile therein, although normally the thermosetting polymer will be heated to a temperature such that it is substantially cured.

Thereafter, the gelled or cured first coating is coated with a second coating of a transparent second coating composition, wherein the second coating has a thickness of at least about 0.5 mil. The transparent second coating composition contains a substantially clear, film-forming second polymer, and at least a tinctorial amount of at least one coloring agent which is substantially soluble in the second polymer. The second coating composition may contain other conventional additives if desired. It is critical that the second coating composition, when cured, be substantially transparent, so that the reflective flake pigment is visible therethrough. The second coating composition should be at least somewhat compatible with the first coating composition, and should adhere readily thereto. The second polymer may be any conventional film-forming polymer, as long as such polymer is at least substantially clear. The polymer is preferably a thermosetting polymer, such as a polyester, epoxy or acrylic polymer, and more preferably is a polyester polymer. As indicated, the second coating composition also contains a tinctorial amount, preferably at least about 0.1% by weight, based on the weight of the second coating composition, of a coloring agent which is substantially soluble in the second polymer. For most applications, it is preferred that the coloring agent exhibit substantial ultraviolet degradation resistance, but for some applications this may not be necessary. In any event, the coloring agent must be substantially soluble in the second polymer, and is chosen to tint the polymer the desired shade. The maximum amount of coloring agent will be that amount above which a transparent second coating cannot be obtained. Generally this maximum amount of coloring agent will be around 3% by weight, based on the weight of the second coating composition, but this will vary depending upon the particular tinctorial power of the specific coloring agent and the thickness of the second coating.

It is greatly preferred that the coloring agent used in the second coating composition of the present invention be a pigment which is soluble in the second polymer, as pigments generally exhibit greatly increased ultraviolet resistance, as compared to dyes. However, it will be readily appreciated that the use of dyes may be acceptable for applications wherein the coating is not subjected to prolonged outdoor exposure.

Any pigment or dye may be used in the second coating composition, as long as such pigment or dye is substantially soluble in the second polymer, and heat stable at the temperatures encountered in the curing or fusing of the second polymer, and any subsequent temperatures to which it may be exposed. Of course, the pigment or dye should not adversely react with any of the components of the coating composition, but within these broad parameters any of the coloring agents known in the art may be used.

While, as indicated above, the second polymer is preferably a thermosetting polymer, it is possible to use a thermoplastic polymer in this second coating composition. Typical examples of such thermoplastic polymers are cellulose acetate butyrate (CAB) polymers, acrylic polymers, vinyl polymers and the like. However, thermosetting polymers are preferred because of their greater abrasion resistance, higher film strength, and, in at least some instances, greater compatibility with the first polymer.

In the final step of the process, the second polymer is cured or fused, and this can be by any conventional method, depending upon the particular nature of the second polymer. Normally, the curing or fusing will be accomplished by heating, with the particular temperature chosen varying with the nature of the polymer. Thermosetting polymers will generally be heated to a temperature of about 300° to 450° F, but as indicated, this can vary considerably. Alternatively, some thermosetting polymers may be cured by passing same through a gaseous atmosphere which causes the polymer to cure, or the polymer may be subjected to high energy irradiation to cure same, or other techniques known in the art for curing thermosetting polymers may be utilized. However, the curing method must be one which results in a smooth, integral, transparent layer of second polymer being formed, and thus the use of a heating step to cause the polymer to cure or fuse is greatly preferred.

The first coating and the second coating will normally be at least about 0.5 mil thick, and there is no real upper limit on the thickness of the first coating. For electrostatic application, however, it has been found difficult to apply coatings greater than 5 mils in thickness, so that this will preferably be the upper range of the first coating thickness. More preferably, the first coating is about 1.5 – 3 mils thick. The second coating may also vary widely in thickness, so long as the coating thickness is not great enough to impair the transparent nature of the coating, but preferably a maximum thickness of around 5 mils will be used, due to difficulty of applying greater thicknesses by electrostatic means. More preferably, the second coating is about 1.5 – 3 mils thick.

If one or both of the coatings are applied by means other than electrostatic application means, then greater thicknesses than above indicated may be produced.

It is believed that the coated article produced by the process of the present invention is also novel. This coated article consists of a conductive substrate, having two coatings thereon, a first coating and an overlying second coating. The first coating consists of a cured polyester polymer containing the bright reflective metallic flake pigment, with the flake pigment being oriented so that the major dimensions of the flake pigment are substantially parallel to the surface of the substrate. The second coating is a substantially transparent coating adhered to the first coating, and consists of a cured, substantially clear film-forming second polymer containing at least about 0.1% by weight of a coloring agent which is soluble in the polymer. Each of these coatings are at least about 0.5 mil thick, as indicated hereinbefore.

The reflective coatings have high depth of appearance produced by the present invention are highly suitable for decorative and protective coatings on bicycle frames and fenders, motorcycle frames and fenders, and the like. For applications wherein the coated articles are subjected to the weather, it is preferred that the various components of the coatings exhibit good resistance to weathering, including good ultraviolet degradation resistance.

EXAMPLES OF THE INVENTION

EXAMPLE 1

This example relates to a metallic coating having good ultraviolet light resistance, excellent depth appearance and high gloss, which coating is highly suitable for use as a decorative and protective coating on bicycle frames, for instance.

The coating was based upon two coating compositions, a metallic coating and a dyed clear coating. The metallic coating utilized 82 parts by weight of polyester resin (Cargill XPE 9000 a neopentyl glycol terephthalate ester having a 50–60 hydroxyl number, an equivalent weight of 930–1100, and a viscosity of 35–40 poises at 320° F.), 82 parts by weight; a blocked isocyanate catalyst (Cargill CR 10, a caprolactam-blocked aliphatic isocyanate catalyst having an equivalent weight of 240, no free isocyanate moieties and an unblocking temperature of 320°–360° F.), 18 parts by weight; flow agent (Resimix, a low molecular weight acrylate polymer made by Mohawk Industries), 0.53 parts by weight; and aluminum flake pigment (United States Bronze Powders, Inc. No. 993, an extra fine leafing powder having a thickness of 0.000005–0.000008 inch, 10,000,000–20,000,000 particles/gram, a water coverage of about 19,000 $cm^2/gr$, a surface area of about 38,000 $cm^2/gm.$, and 100 percent pass 100 mesh and 99.9 percent pass 325 mesh and an irregular shape wherein the average width was about equal the average length, was used in an amount of 2.75 percent of the other, above components of the metallic coating.

The dyed clear component comprised polyester resin (the same as used in the metallic coating), 82 parts by weight; blocked isocyanate catalyst (the same as used in the metallic coating), 18 parts by weight; flow agent (the same as in the metallic coating), 0.4 parts by weight; and a polymer-soluble coloring agent (Ciba Orasol Black, a metal complex azo pigment soluble in the polyester resin), in an amount of 0.2 percent by weight based on the other components of the dyed clear composition.

Bicycle frames of both aluminum and cold rolled steel, were coated with a flamboyant finish using the above coating compositions. The bicycle frames were electrostatically spray coated with about 2 mils dry film thickness of the above metallic coating, and then baked at a temperature of 440° F for 11 minutes. In about 4 minutes the coating had reached the catalyst unblocking temperature of 320° F, and after 7 minutes in the oven the coating was at a temperature of about 440° F. The coated bicycle frames were cooled to approximately room temperature and then overcoated by electrostatically spraying a coating of about 2 mils dry film thickness of the dyed clear composition. This was followed by a baking step in an oven maintained at 440° F for 11 minutes.

The resulting coating had excellent gloss and depth of appearance, with a smooth metallic luster, and exhibited good resistance to ultraviolet exposure. Thus, the resultant coating produced a highly suitable decorative, flamboyant finish on the bicycle frames.

EXAMPLE 2

Example 1 was repeated, but the Ciba Orasol Black coloring agent was replaced by an equal amount of Ciba Orasol Violet 3BN, Solvent Violet 1, C.I. 12196, with similar results.

I claim:

1. A method of applying a coating having good depth appearance to an electrically conductive substrate, said method comprising applying to said substrate a coating at least ½ mil thick of a first coating composition consisting essentially of at least one substantially clear thermosetting film-forming polymer, a catalytic amount of at least one blocked catalyst for said polymer, wherein said catalyst unblocks at a temperature at least 5° F above the melting temperature of said thermosetting polymer, and a pigmenting amount of at least one bright reflective leafing flake pigment, heating the first coating composition on said substrate to a first temperature below the catalyst unblocking temperature and above the polymer melting temperature to permit the flake pigments to substantially become oriented parallel to the surface of said composition away from said substrate, and thereafter gelling or curing said polymer by heating said first coating composition to a higher second temperature which is above the catalyst unblocking temperature while maintaining the flake pigments substantially in said oriented position, to produce a gelled or cured first coating having a bright reflective appearance, and thereafter coating the first coating with a second coating at least one half mil thick of a transparent second coating composition consisting essentially of at least one at least substantially clear film-forming second polymer and a tinctorial amount which is at least about 0.1% by weight, based on the weight of said second coating composition, of at least one coloring agent which is substantially soluble in said second polymer and heat stable at the curing or fusing temperatures of said second polymer, and thereafter curing or fusing said second polymer to form an integral film thereof.

2. Method of claim 1, wherein the flake pigment has an average maximum dimension of about 10 microns.

3. Method of claim 2, wherein said flake pigment is selected from the group consisting of aluminum, chromium, bronze, nickel, stainless steel, and silver leafing pigments.

4. Method of claim 3, wherein said pigment is a leafing aluminum pigment.

5. Method of claim 4, wherein at least about 2.0% by weight, based on the weight of said first coating composition, of said flake pigment is used.

6. Method according to claim 5, wherein about 2 to 3.5% by weight of flake pigment is used.

7. Method according to claim 1, wherein said first coating is about 0.5 to 5 mils thick.

8. Method according to claim 7, wherein said first coating is about 1.5 to 3 mils thick.

9. Method according to claim 1, wherein said second polymer is selected from the group consisting of thermosetting polyester, epoxy, urethane and acrylic polymers.

10. Method according to claim 9, wherein said second polymer is a polyester polymer.

11. Method according to claim 1, wherein said coloring agent is a dye which exhibits high UV resistance.

12. Method according to claim 11, wherein the dye is an azo dye.

13. Method according to claim 1, wherein about 1 to 3% by weight, based on the weight of said second coating composition, of coloring agent is used.

14. Method according to claim 1, wherein the second coating is about 1 to 5 mils thick.

15. Method according to claim 14, wherein said second coating is about 1.5 to 3 mils thick.

16. Method according to claim 1, wherein said first temperature is about 250° F to about 325° F, said second temperature is about 350° F to about 450° F, and wherein said second polymer is cured by heating to a temperature of about 300° F to 450° F.

17. Article consisting essentially of an electrically conductive substrate, a first coating on said substrate, said first coating consisting essentially of a cured thermosetting polymer and a pigmenting amount of at least one bright reflective leafing flake pigment, said flake pigment oriented substantially parallel to the surface of said polymer, and a transparent second coating over said first coating, said second coating consisting essentially of at least one substantially clear film-forming second polymer containing at least about 0.1% by weight of at least one dye substantially dissolved therein, said coatings each at least about ½ mil thick.

18. Article of claim 17, wherein said article is the frame or fender of a bicycle.

19. Article of claim 17, wherein said article is the frame or fender of a motorcycle.

20. Article of claim 17, wherein said pigment is selected from the group consisting of aluminum, chromium, bronze, nickel, stainless steel and silver leafing pigments.

21. Article of claim 17, wherein said pigment is a leafing aluminum pigment.

22. Article of claim 17, wherein said first coating contains at least about 2% by weight of said flake pigment.

23. Article of claim 22, wherein said first coating contains about 2.0 to 3.5% by weight of said flake pigment.

24. Article of claim 17, wherein said first coating is about 0.5 to 5 mils thick.

25. Article of claim 24, wherein said first coating is 1.5 to 3 mils thick.

26. Article of claim 17, wherein said second polymer is selected from the group consisting of polyester, epoxy, urethane and acrylic polymers.

27. Article of claim 26, wherein said second polymer is a polyester polymer.

28. Article of claim 17, wherein said coloring agent is a dye which exhibits high UV resistance.

29. Article of claim 28, wherein said dye is an azo dye.

30. Article of claim 17, wherein said second coating contains about 1% to 3% by weight of coloring agent.

31. Article of claim 17, wherein said second coating is about 0.5 to 5 mils thick.

32. Article of claim 31, wherein said second coating is 1.5 to 3 mils thick.

33. Method according to claim 1, wherein said first coating is applied by electrostatically spraying said first coating composition on said conductive substrate.

* * * * *